United States Patent
Inamine

(10) Patent No.: US 6,317,802 B1
(45) Date of Patent: Nov. 13, 2001

(54) SYSTEM FOR CONVERTING RASTER IMAGE DATA CONTAINED IN PRINT DATA INTO RASTER IMAGE DATA HAVING A RESOLUTION WITH WHICH A STENCIL PRINTER IS CAPABLE OF PRINTING

(75) Inventor: Noboru Inamine, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/231,776

(22) Filed: Jan. 15, 1999

(30) Foreign Application Priority Data

Jan. 19, 1998 (JP) .................................................. 10-007395

(51) Int. Cl.$^7$ ..................................................... G06F 13/14
(52) U.S. Cl. ............................ 710/64; 101/128.4; 711/165
(58) Field of Search .................... 710/64, 68; 101/128.4; 711/165

(56) References Cited

U.S. PATENT DOCUMENTS

| | | | | |
|---|---|---|---|---|
| 4,841,375 | * | 6/1989 | Nakajima et al. | 358/466 |
| 5,694,486 | * | 12/1997 | Shigeeda et al. | 382/197 |
| 5,706,369 | * | 1/1998 | Wang et al. | 382/299 |
| 5,732,196 | * | 3/1998 | Watanabe | 395/102 |
| 5,787,487 | * | 7/1998 | Hashimoto et al. | 711/165 |
| 5,788,385 | * | 8/1998 | Inoue et al. | 400/279 |
| 5,835,122 | * | 11/1998 | Oki et al. | 347/251 |
| 5,841,552 | * | 11/1998 | Atobe et al. | 358/447 |
| 5,862,305 | * | 1/1999 | Girmay et al. | 395/102 |
| 6,125,748 | * | 10/2000 | Inamine | 101/128.4 |

* cited by examiner

Primary Examiner—Thomas Lee
Assistant Examiner—Abdelmoniem Elamin
(74) Attorney, Agent, or Firm—Nixon Peabody LLP; Donald R. Studebaker

(57) ABSTRACT

A data input device fetches print data containing raster image data, which has been formed by a computer, and first resolution data, which represents resolution of the raster image data having been formed by the computer. A printer resolution reading device reads second resolution data representing resolution, with which a stencil printer can print, from the stencil printer. A resolution converting device carries out resolution conversion for converting the raster image data, which is contained in the print data having been fetched by the data input device, into raster image data having the resolution, with which the stencil printer can print, in accordance with the first resolution data and the second resolution data. A data output device forms output data in accordance with the raster image data having been obtained from the resolution conversion and feeds the output data into the stencil printer.

3 Claims, 6 Drawing Sheets

SYSTEM FOR CONVERTING RASTER IMAGE DATA CONTAINED IN PRINT DATA INTO RASTER IMAGE DATA HAVING A RESOLUTION WITH WHICH A STENCIL PRINTER IS CAPABLE OF PRINTING

BACKGROUND OF THE INVENTION

1. Field of the Invention

This invention relates to a computer interface apparatus, which is to be located between a computer, such as a personal computer, and a stencil printer and connects them with each other such that a print may be formed by the stencil printer in accordance with print data having been formed by the computer.

2. Description of the Prior Art

In cases where prints are to be formed by a printer in accordance with data (text data, image data, or the like) having been formed by a personal computer, a printer driver, which has been installed in the personal computer in accordance with resolution of the printer, has heretofore converted the text data, or the like, which has been formed by the personal computer, in accordance with a printing instruction given by application software functions, such that the converted data matching with the resolution of the printer may be obtained. Print data has heretofore been formed in this manner. (Such print data is referred to as the "resolution-dependent type of print data.") Also, recently, print data, which has been fed from a personal computer, is often used directly for forming prints by a stencil printer.

FIG. 7 is a block diagram showing a system comprising a personal computer, a computer interface apparatus, and a personal computer, in which a print is formed by the stencil printer in accordance with print data having been fed from the personal computer. As illustrated in FIG. 7, the system comprises a personal computer 1, which is an example of the computer, a stencil printer 3, and a computer interface apparatus 2, which is connected between the personal computer 1 and the stencil printer 3. When the print data is inputted from the personal computer 1 into the computer interface apparatus 2, the computer interface apparatus 2 forms page output data for the stencil printer in accordance with address data, raster image data, page discharging data, and the like, which are contained in the print data having been received from the personal computer 1. Thereafter, the computer interface apparatus 2 feeds the page output data into the stencil printer 3. The stencil printer 3 carries out a printing operation in accordance with the page output data, which has been received from the computer interface apparatus 2. Also, by connecting the computer interface apparatus 2 with a modem (modulator-demodulator) 5, print data, which is fed out from a personal computer 4 located at a remote site, may be utilized for forming a print with the stencil printer 3 via a modem 6.

Ordinarily, in cases where a print is to be formed by a stencil printer in accordance with the resolution-dependent type of print data, which has been formed by a personal computer, print data, which conform to the resolution of the stencil printer connected to the computer interface apparatus, are formed on the side of the personal computer, and resolution converting functions are not required in the computer interface apparatus. Therefore, in cases where one of stencil printers having different levels of resolution, e.g. 300 dpi, 400 dpi, and 600 dpi, is connected to the computer interface apparatus, if the resolution of the stencil printer connected to the computer interface apparatus does not coincide with the resolution assumed by the personal computer, some problems occur in that the image information represented by the print data cannot be printed at correct printing positions, and image expansion or contraction and image collapse will occur on the print.

Also, in cases where print data can be formed only with a predetermined resolution depending on a personal computer and only one kind of stencil printer is available, a conversion of resolution, which converts the resolution of the page output data to the resolution of the stencil printer is carried out on the computer interface apparatus. However, with such a technique, if another stencil printer having another resolution is connected to the computer interface apparatus, image expansion or contraction and image collapse will occur on the print, and normal printing cannot be carried out.

Further, in cases where data transfer is carried out via modems, an operator, who is located at the remote site near the modem and the personal computer, cannot discriminate the type of the stencil printer connected to the computer interface apparatus. Therefore, it is difficult for the operator, who is located at the remote site, to recognize the resolution of the stencil printer connected to the computer interface apparatus. Thus the problems have heretofore been encountered in that the print data, which is transferred from the personal computer, cannot always be obtained as the print data conforming to the resolution of the stencil printer.

SUMMARY OF THE INVENTION

The primary object of the present invention is to provide a method of forming output data for a stencil printer, which enables a normal print free from image expansion or contraction and image collapse to be obtained even if resolution of print data formed by a personal computer and resolution of a stencil printer connected through the personal computer are different from each other.

Another object of the present invention is to provide a computer interface apparatus for carrying out the method of forming output data for a stencil printer.

The present invention provides a computer interface apparatus, which is to be located between a computer and a stencil printer and carries out operations for forming output data in accordance with print data and feeding the output data into the stencil printer, the print data containing raster image data, which has been formed by the computer, and first resolution data, which represents resolution of the raster image data having been formed by the computer, the apparatus comprising:

i) a data input means for fetching the print data, ii) a printer resolution reading means for reading second resolution data representing resolution, with which the stencil printer is capable of printing, from the stencil printer, iii) a resolution converting means for carrying out resolution conversion for converting the raster image data, which is contained in the print data having been fetched by the data input means, into raster image data having the resolution, with which the stencil printer is capable of printing, the resolution conversion being carried out in accordance with the first resolution data, which is contained in the print data having been fetched by the data input means, and the second resolution data, which has been read by the printer resolution reading means, and iv) a data output means for forming the output data in accordance with the raster image data, which has been obtained from the resolution conversion carried out by the resolution converting means, and feeding the output data into the stencil printer.

The present invention also provides a method of forming output data for a stencil printer, wherein output data for a stencil printer is formed in accordance with print data, the print data containing raster image data, which has been formed by a computer, and first resolution data, which represents resolution of the raster image data having been formed by the computer, the method comprising the steps of:

i) fetching the print data, ii) reading second resolution data representing resolution, with which the stencil printer is capable of printing, from the stencil printer, iii) carrying out resolution conversion for converting the raster image data, which is contained in the print data having been fetched, into raster image data having the resolution, with which the stencil printer is capable of printing, the resolution conversion being carried out in accordance with the first resolution data, which is contained in the print data having been fetched, and the second resolution data having been read from the stencil printer and representing the resolution, with which the stencil printer is capable of printing, and iv) forming the output data in accordance with the raster image data, which has been obtained from the resolution conversion.

The term "converting raster image data into raster image data having resolution, with which a stencil printer is capable of printing" as used herein means that the resolution of the raster image data, which is contained in the print data, is converted such that the resolution of the raster image data after being converted may coincide with the output resolution of the stencil printer. Also, the output data for the stencil printer is the one ordinarily referred to as the "page output data."

In cases where the print data is fed into the computer interface apparatus, the raster image data and the first resolution data may be separately fed into the computer interface apparatus. Alternatively, the raster image data and the first resolution data may be fed together as single combined data into the computer interface apparatus and may then be separated from each other by the computer interface apparatus. Also, the term "forming output data for a stencil printer in accordance with raster image data having been obtained from resolution conversion" as used herein means that the output data is formed in accordance with at least the raster image data having been obtained from the resolution conversion. Specifically, besides the raster image data having been obtained from the resolution conversion, the output data may be formed by making reference to address data, page discharging data, and the like, which are ordinarily contained in the print data.

With the computer interface apparatus and the method of forming output data for a stencil printer in accordance with the present invention, the resolution of the stencil printer is read, and the resolution of the print data, which has been formed by the computer, such as a personal computer, is converted automatically such that the resolution of the converted data may conform to the resolution of the stencil printer. Therefore, in every case where one of stencil printers having different resolution is connected to the computer interface apparatus and with respect to one kind of printer driver on the side of the personal computer, a normal print, which is free from image expansion or contraction and image collapse, can be obtained. Accordingly, a flexibility of the system constitution can be enhanced. Also, in cases where print data is transferred from a personal computer, which is located at a remote site, to the computer interface apparatus, it is not necessary to confirm the resolution of the stencil printer, which is connected to the computer interface apparatus on the data receiving side, and the data transfer can be carried out regardless of the resolution of the stencil printer. Further, in such cases, the time required to carry out the data transfer can be kept short by intentionally reducing the resolution of the data to be transferred.

DESCRIPTION OF THE PREFERRED EMBODIMENTS

The present invention will hereinbelow be described in further detail with reference to the accompanying drawings.

Figure 1:
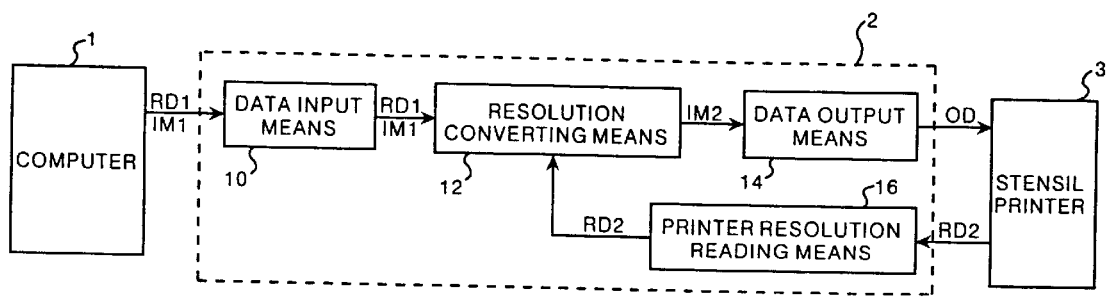
FIG. 1 is a block diagram showing a fundamental constitution of the computer interface apparatus in accordance with the present invention.

FIG. 1 is a block diagram showing a fundamental constitution of the computer interface apparatus in accordance with the present invention, which connects a personal computer 1 and a stencil printer 3 with each other.

With reference to FIG. 1, a computer interface apparatus (hereinbelow referred to as the IF apparatus) 2 comprises a data input means 10 for fetching print data from the personal computer 1. Then print data contains raster image data IM1, first resolution data (input resolution data) RD1, which represents resolution of the raster image data IM1, address data, page discharging data, and the like. The IF apparatus 2 also comprises a printer resolution reading means 16 for reading second resolution data (output resolution data) RD2 representing resolution (output resolution), with which the stencil printer 3 is capable of printing, from the stencil printer 3. The IF apparatus 2 further comprises a resolution converting means 12 for carrying out resolution conversion for converting the raster image data IM1, which are contained in the print data having been fetched by the data input means 10, into raster image data IM2 having the resolution, with which the stencil printer 3 is capable of printing (i.e., which is the same as the output resolution). The resolution conversion is carried out in accordance with the input resolution data RD1, which is contained in the print data having been fetched by the data input means 10, and the output resolution data RD2, which has been read by the printer resolution reading means 16. The IF apparatus 2 still further comprises a data output means 14 for forming page output data OD in accordance with the raster image data IM2, which has been obtained from the resolution conversion carried out by the resolution converting means 12, and feeding the output data into the stencil printer 3.

In the IF apparatus 2, the data input means 10 fetches the raster image data IM1, which has been formed by the personal computer 1, and the input resolution data RD1. Also, the printer resolution reading means 16 read the output resolution data RD2 from the stencil printer 3. Further, in accordance with the input resolution data RD1, which has been fetched by the data input means 10, and the output resolution data RD2, which has been read by the printer resolution reading means 16, the resolution converting means 12 carries out the resolution conversion on the raster image data IM1, such that the raster image data having the same resolution as the output resolution may be obtained. In this manner, the raster image data IM2 is obtained from the resolution converting means 12. The data output means 14 forms the output data OD in accordance with the raster image data IM2, the address data, and the page discharging data and then feeds the output data OD into the stencil printer 3.

Since the IF apparatus 2 is thus located between the personal computer 1 and the stencil printer 3, even if the resolution of the raster image data IM1, which is contained in the print data having been formed by the personal computer 1, and the output resolution of the stencil printer 3 are different from each other, the resolution of the raster image data IM1 can be converted automatically in accordance with the input resolution data RD1 and the output resolution data RD2, such that the raster image data IM2 having the same resolution as the output resolution may be obtained.

Figure 2:
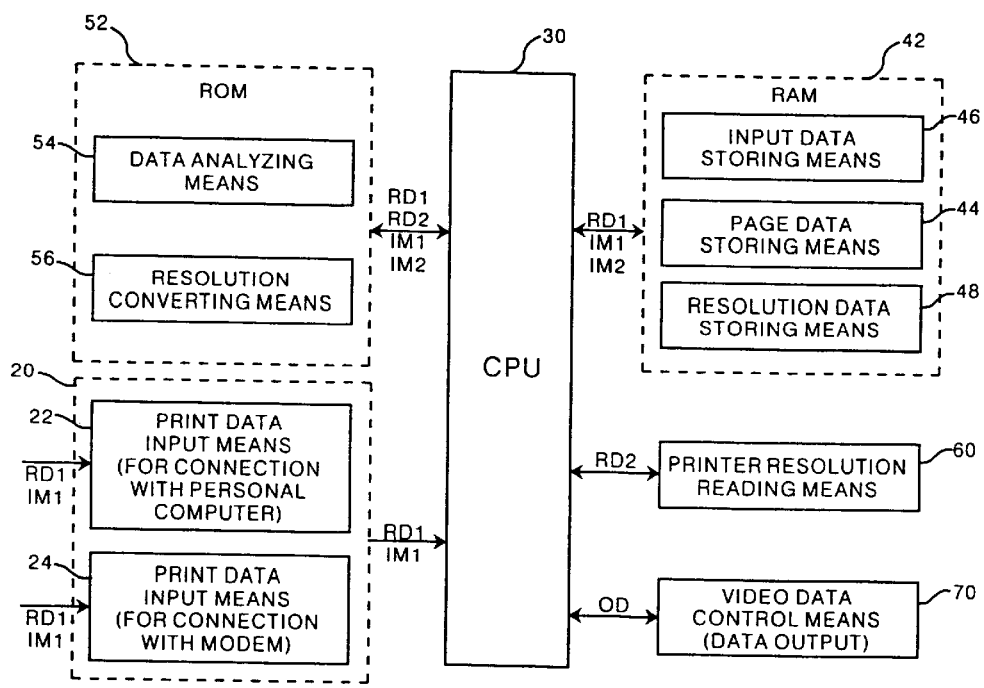
FIG. 2 is a block diagram showing an embodiment of the computer interface apparatus in accordance with the present invention.
Figure 7:
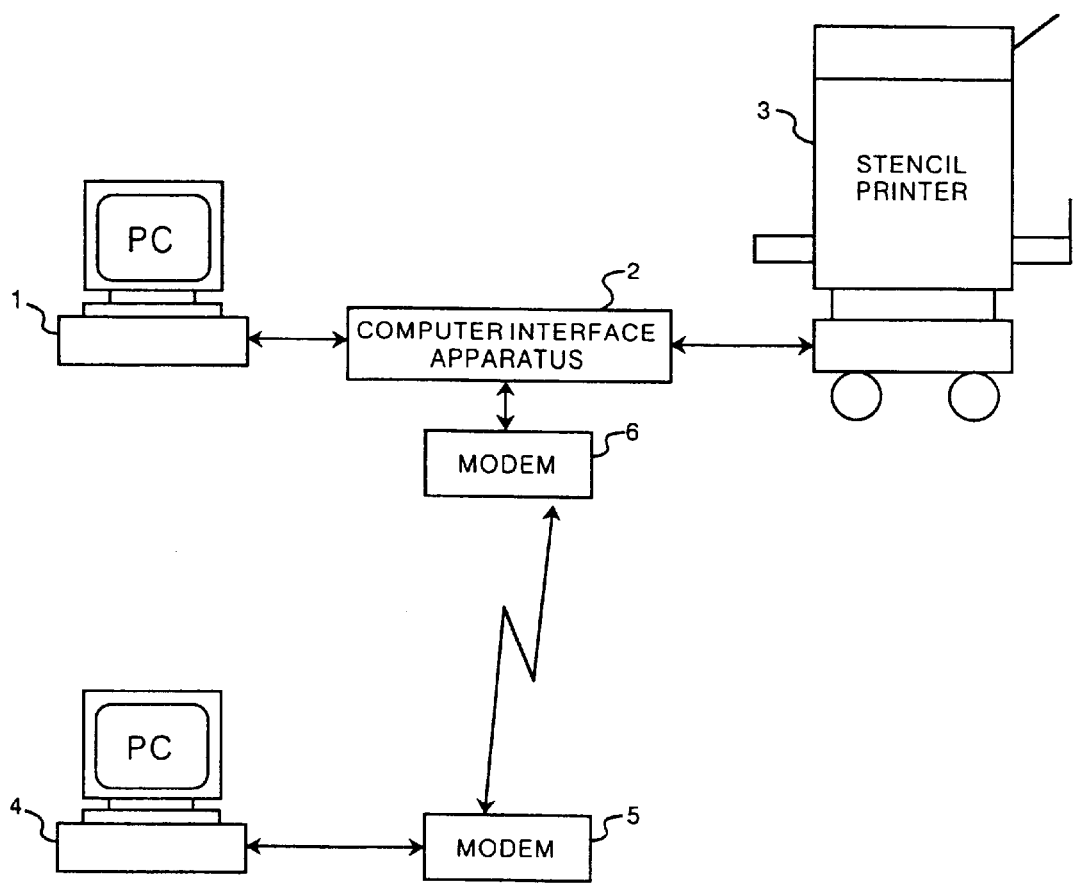
FIG. 7 is a block diagram showing a system comprising a personal computer, a computer interface apparatus, and a personal computer.

FIG. 2 is a block diagram showing an embodiment of the computer interface apparatus in accordance with the present invention. As illustrated in FIG. 2, the IF apparatus comprises a data input means 20 provided with a print data input means 22 and/or a print data input means 24. The print data input means 22 is connected directly to a personal computer (not shown) and fetches the print data, which is fed from the personal computer. The print data input means 24 is connected via modems to a personal computer (not shown) and fetches print data, which is fed from the personal computer. The IF apparatus also comprises a CPU 30 having central functions for receiving the print data, which has been fetched by the data input means 20, carrying out various kinds of processing on the print data, and thereby forming the page output data OD for a stencil printer. The CPU 30 is connected to a RAM 42, a ROM 52, and a printer resolution reading means 60, which carry out predetermined processing by carrying out data transfer with the CPU 30. The RAM 42 is provided with an input data storing means 44, a page data storing means 46, and a resolution data storing means 48. The ROM 52 is provided with a data analyzing means 54 and a resolution converting means 56. The CPU 30 is also connected to a video data control means 70 for feeding the formed output data OD into the stencil printer. The CPU 30, the data analyzing means 54, the RAM 42, and the video data control means 70 together constitute the data output means 14 shown in FIG. 1. In the IF apparatus, the printer resolution reading means 60 and the video data control means 70 are connected to the stencil printer (not shown). The personal computer, the IF apparatus, and the stencil printer may be associated with one another in order to construct the system shown in FIG. 7, and the print data having been fed out from the personal computer can thereby be used for printing with the stencil printer.

Figure 3:
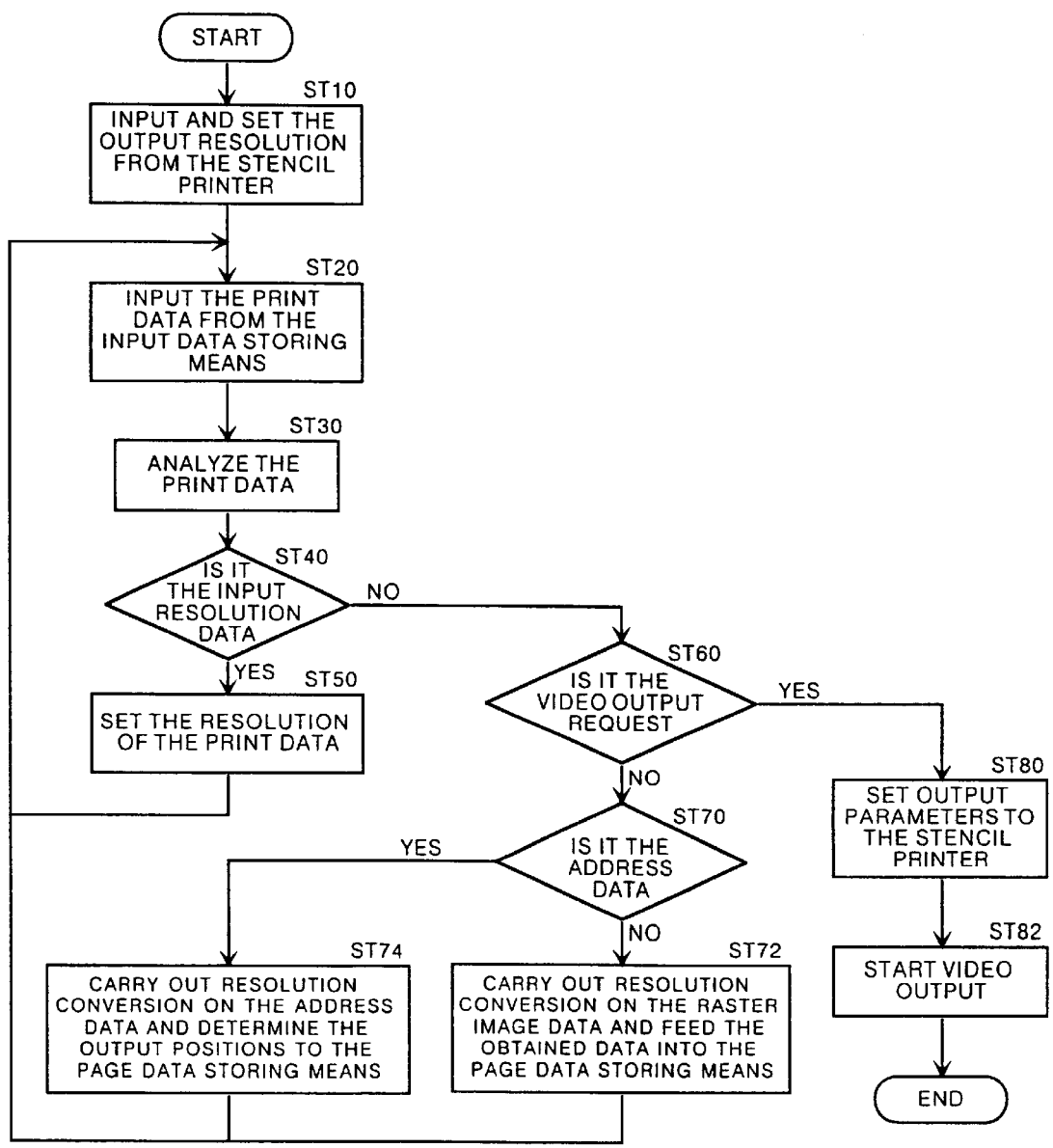
FIG. 3 is a flow chart showing how the embodiment of FIG. 2 operates.

How the IF apparatus shown in FIG. 2 operates will be described hereinbelow. Firstly, how the IF apparatus operates will be briefly described with reference to FIG. 3. In FIG. 3, ST indicates the step number.

The CPU 30 fetches the print data, which has been edited by the personal computer, via the data input means 20. The fetched print data is stored in the input data storing means 44 of the RAM 42. After the fetched print data has been stored, in a step ST10, the printer resolution reading means 60 reads the output resolution of the stencil printer, feeds the information, which represents the output resolution having been read, into the CPU 30, and sets the information in the CPU 30. The print data, which is fed from the personal computer, is composed of the resolution data (the input resolution data) RD1, which represents the resolution of the print data, the address data, which represents the printing positions on a page, the raster image data IM1, which represents the information to be printed, and the page discharging data, which represents a division of each page, and the like. In a step ST20, the print data is read from the input data storing means 44. In a step ST30, the print data is analyzed by the data analyzing means 54 and classified into input resolution data RD1, the address data, the raster image data IM1, the page discharging data, and the like. Also, in steps ST40 and ST50, in cases where the print data is the input resolution data RD1, the resolution of the print data is set in the resolution data storing means 48. In steps ST40 and ST60, in cases where the print data is not the input resolution data RD1, a judgment is made as to whether a video output is or is not requested.

In steps ST70 and ST74, in cases where the video output is not requested and the print data is the address data, the resolution conversion is carried out on the input address data such that the resolution of the output data OD may become identical with (may conform to) the resolution, with which the stencil printer is capable of printing. Also, the printing positions (the output addresses) to the page data storing means 46 are determined. In steps ST70 and ST72, in cases where the print data is not the address data, the resolution conversion is carried out on the raster image data IM1, and the raster image data IM2 is thereby obtained. The obtained raster image data IM2 is fed into the page data storing means 46 and is temporarily stored in it. In cases where the page discharging data is classified by the resolution converting means 56 and it has been judged that the video output is requested, in steps ST80 and ST82, respective output parameters are set in the stencil printer, and the raster image data IM2 is read from the page data storing means 46 and fed as the output data OD via the video data control means 70 into the stencil printer.

Figure 4:
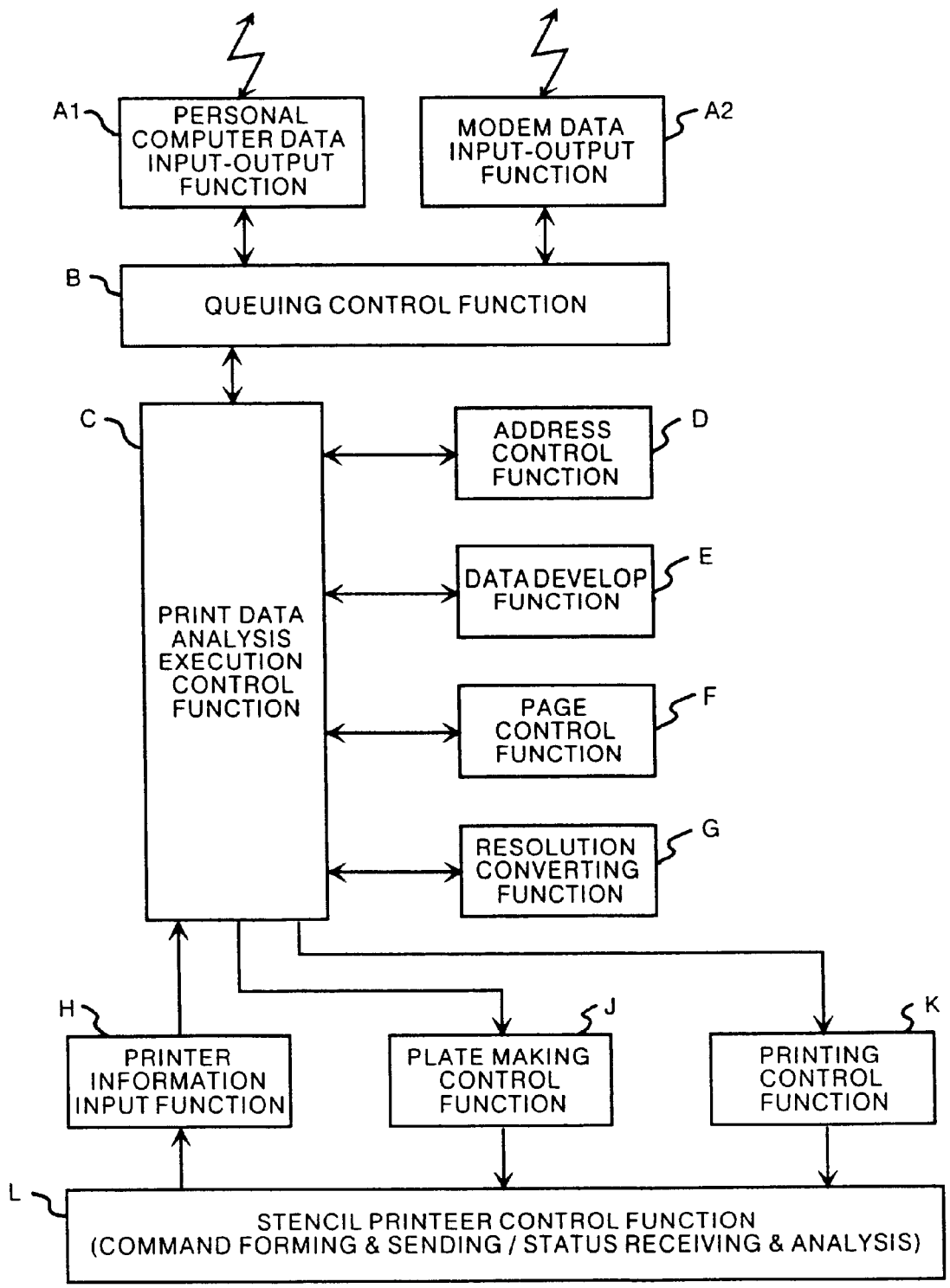
FIG. 4 is a block diagram showing functions of the embodiment of FIG. 2.

FIG. 4 is a block diagram showing functions of the embodiment of FIG. 2. How the IF apparatus shown in FIG. 2 operates will hereinbelow be described in more detail with reference to FIG. 4. The function block diagram of FIG. 4 illustrates the IF apparatus of FIG. 2 with respect to its functions. The IF apparatus has a system for directly fetching print data, which has been edited by a personal computer, with the print data input means 22, and a system for fetching print data through communication via modems and with the print data input means 24. The print data, which is fed from the personal computer connected directly to the IF apparatus, is fetched into the CPU 30 with a personal computer data input-output function A1 of the print data input means 22. The print data, which is fed from the personal computer associated through communication via the modems, is fetched into the CPU 30 with a modem data input-output function A2 of the print data input means 24. With a queuing control function B, the CPU 30, which has received the print data, temporarily stores the print data in regular order in the input data storing means 44.

A print data analysis execution control function C is a central. function for carrying various kinds of processing on the print data and thereby forming the output data OD. With the print data analysis execution control function C, data transfer is carried out with respect to various functions, and the output data OD is thereby formed. The output data OD is ultimately transferred to a stencil printer control function L via a plate making control function J. With the print data analysis execution control function C, the print data, which has been stored in the input data storing means 44 with the queuing control function B, is fetched from the input data storing means 44, and an analysis is made (by the data analyzing means 54) as to whether the data is the input resolution data RD1, the address data, the raster image data IM1, or the page discharging data. Also, when necessary, the corresponding data is fed to an address control function D, a data develop function E, and a page control function F.

With the address control function D, under the concept of a page, address control is carried out for specifying the position, from which the writing of the print information represented by the print data is to be begun. With the data develop function E, the print data, which has ordinarily been compressed, is restored to the original print data. With the page control function F, in cases where the print data corresponding to a plurality of pages is spooled such that the data processing may be carried out quickly, the order, in which the pages are reproduced, is controlled. (Ordinarily, a discharging process is carried out when the processing for one page is finished.)

With a resolution converting function G of the resolution converting means 56, the resolution of the raster image data IM1 is converted such that the resolution of the output data OD fed into the stencil printer may conform to the resolution of the stencil printer, and the raster image data IM2 is thereby obtained (as will be described later). The raster image data IM2, which has been obtained from the resolution conversion, is temporarily stored in the page data storing means 46. With a printer information input function H of the printer resolution reading means 60, the output resolution data RD2, which represents the resolution of the printer and has been fetched with the stencil printer control function L from the stencil printer, is read and transferred to the print data analysis execution control function C. With the print data analysis execution control function C, when necessary, the resolution converting function G is caused to carry out the resolution conversion in accordance with the input resolution data RD1, which has been stored in the resolution data storing means 48, and the output resolution data RD2.

With the plate making control function J, with respect to the data corresponding to one page, for which the data analysis and resolution conversion have been finished, a plate making start instruction is given to the stencil printer control function L. With a printing control function K, after a plate has been made with the plate making control function J, the number of prints to be formed is set, and a printing start instruction is given to the stencil printer control function L. With the stencil printer control function L, after the plate making start instruction has been given from the plate making control function J, the page output data, which has been stored in the page data storing means 46, is fed as the output data into the stencil printer together with command data. Besides the output resolution data of the stencil printer, the stencil printer control function L also receives status data, which represents the operating condition of the stencil printer, or the like. The stencil printer control function L analyzes the operating condition of the stencil printer, feeds information, which represents the results of the analysis, to the print data analysis execution control function C, and forms command data to be fed into the stencil printer.

Figure 5A:
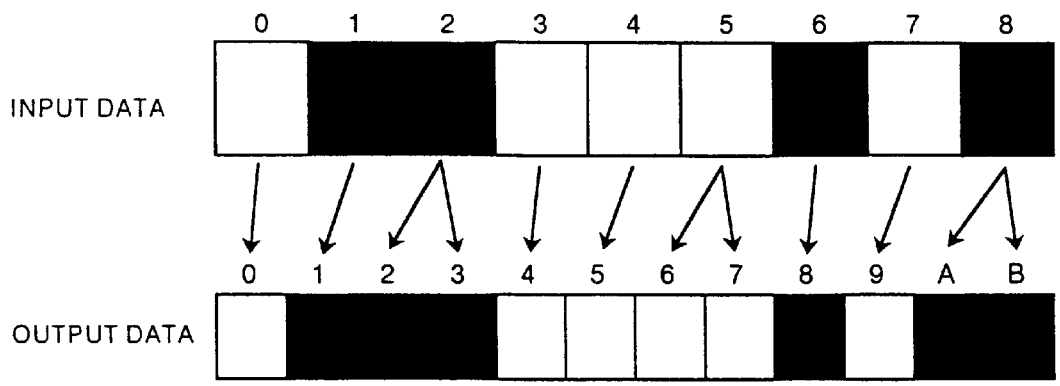
FIG. 5A is an explanatory view showing an example of how input data having a low level of resolution is converted into output data having a high level of resolution.
Figure 5B:
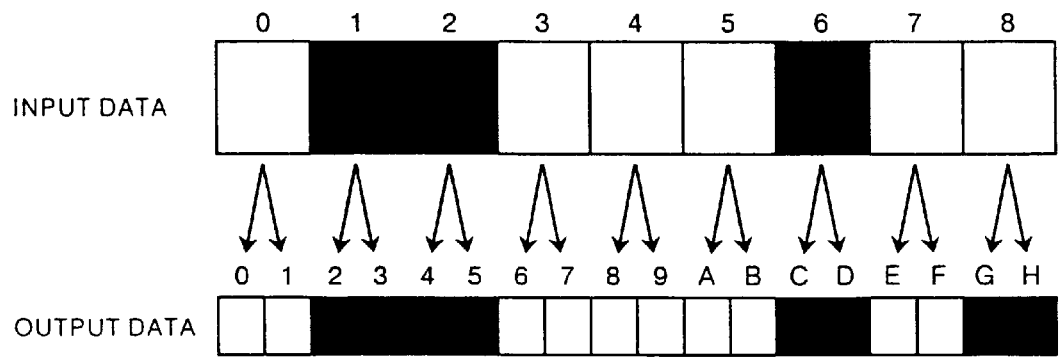
FIG. 5B is an explanatory view showing a different example of how input data having a low level of resolution is converted into output data having a high level of resolution.

The resolution converting function G will hereinbelow be described in detail. In cases where the resolution represented by the input resolution data RD1 is lower than the resolution represented by the output resolution data RD2, it is necessary to carry out the data conversion from the low level of resolution to the high level of resolution. For such purposes, the address data is read from the input data storing means 44, and the output positions (the output addresses) to the page data storing means 46 are determined successively, beginning with an address 0. At this time, with an appropriate input address cycle, two output addresses standing side by side are allocated with respect to one input address, such that no gap may occur when the data is converted from the low level of resolution to the high level of resolution. For example, as illustrated in FIG. 5A, in cases where the input resolution is 300 dpi and the output resolution is 400 dpi, output addresses 2 and 3 may be allocated with respect to an input address 2, output addresses 6 and 7 may be allocated with respect to an input address 5, and output addresses A and B may be allocated with respect to an input address 8. Also, as illustrated in FIG. 5B, in cases where the input resolution is 300 dpi and the output resolution is 600 dpi, two output addresses standing side by side may be allocated with respect to every input address. Specifically, output addresses 0 and 1 may be allocated with respect to an input address 0, output addresses 2 and 3 may be allocated with respect to an input address 1, and so on. In this manner, the values of the raster image data IM1 at the input addresses corresponding to the respective output addresses may be taken as the values of the raster image data IM2 after being converted.

Figure 6A:
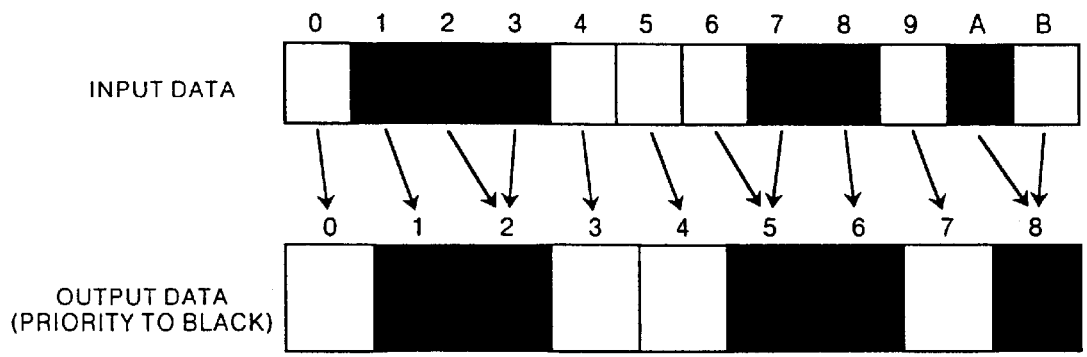
FIG. 6A is an explanatory view showing an example of how input data having a high level of resolution is converted into output data having a low level of resolution.
Figure 6B:
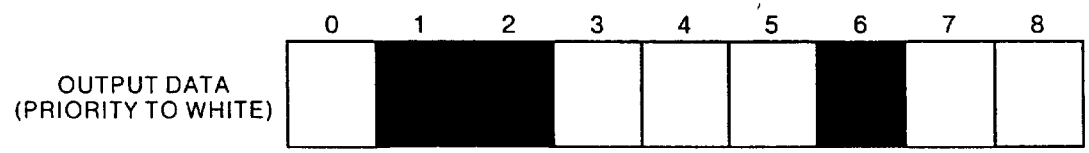
FIGS. 6B, 6C, and 6D are explanatory views showing different. examples of how the input data having a high level of resolution shown in FIG. 6A is converted into output data having a low level of resolution.
Figure 6C:
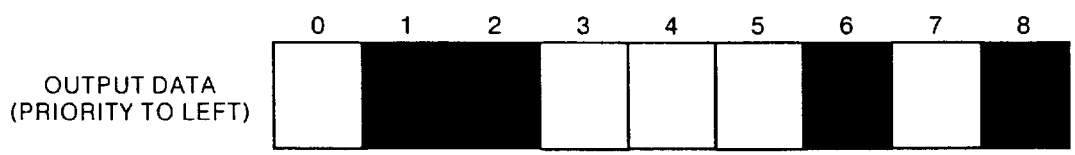
Figure 6D:
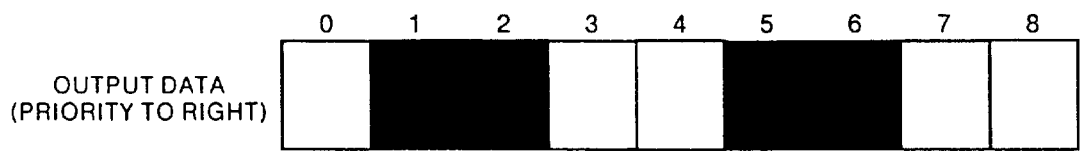

In cases where the resolution represented by the input resolution data RD1 is higher than the resolution represented by the output resolution data RD2, it is necessary to carry out the data conversion from the high level of resolution to the low level of resolution. For such purposes, the address data is read from the input data storing means 44, and the output positions (the output addresses) to the page data storing means 46 are determined successively, beginning with an address 0. At this time, with an appropriate input address cycle, one output address is allocated with respect to either one of two input addresses standing side by side. In this manner, an appropriate dot reduction is carried out such that no data overlapping may occur when the data is converted from the high level of resolution to the low level of resolution. For example, as illustrated in FIG. 6A, in cases where the input resolution is 400 dpi and the output resolution is 300 dpi, an output address 2 may be allocated with respect to input addresses 2 and 3, an output address 5 may be allocated with respect to input addresses 6 and 7, and an output address 8 may be allocated with respect to input addresses A and B. At this time, in cases where the input addresses overlap one upon the other, either one of them is utilized. In this manner, the values of the raster image data IM1 at the input addresses corresponding to the respective output addresses may be taken as the values of the raster image data IM2 after being converted. FIGS. 6B, 6C, and 6D show different examples of how the input data having a high level of resolution shown in FIG. 6A is converted into output data having a low level of resolution.

By way of example, the dot reduction process may be selected from four kinds of processes shown below (priority to black, priority to white, priority to left, priority to right). Specifically, in cases where the data at the input addresses overlapping one upon the other is composed of a combination of black dots, a combination of white dots, or a combination of black and white dots, the dot reduction process is selected from those shown below.

TABLE 1

| Combination of black (left) and black (right) | Black |
|---|---|
| Combination of white (left) and white (right) | White |
| Combination of black (left) and white (right) | Black (priority to black, priority to left) |
| | White (priority to white, priority to right) |
| Combination of white (left) and black (right) | Black (priority to black, priority to right) |
| | White (priority to white, priority to left) |

One of the dot reduction processes may be selected by the user in accordance with his preference. Alternatively, a predetermined process may be set as system default and, when necessary, one of the other processes may be selected by the user. As another alternative, a predetermined dot reduction process may be selected automatically in accordance with the type of the image to be printed.

With the resolution converting function G described above, the address data is read from the input data storing means 44, and the output addresses to the page data storing means 46 are allocated successively, beginning with an address 0. Alternatively, the output addresses corresponding to the input addresses may be determined by carrying out calculations. In such cases, the raster image data IM2 can be formed, beginning with an appropriate input address position. For example, the output addresses may be determined from the input addresses with Formula (1) shown below.

$$\text{Output address} = \text{input address}(\text{output resolution}/\text{input resolution}) \quad (1)$$

In such cases, with Formula (1), a residue will occur, which causes a gap between dots and overlapping of output addresses to occur. Therefore, actually, gap processing and overlap processing (hereinbelow referred to simply as the "gap processing") should be carried out. As an example of the gap processing, processing with a reference table for forming correction values may be employed. The reference table below shows correction values with respect to the residues in the results of the division with Formula (1), which correction values may be utilized in cases where the print data having input resolution of 300 dpi, 400 dpi, and 600 dpi are converted into print data having output resolution of 300 dpi, 400 dpi, and 600 dpi.

TABLE 2

Reference Table

| INPUT RESOLUTION | OUTPUT RESOLUTION | | |
|---|---|---|---|
| | 300 dpi | 400 dpi | 600 dpi |
| 300 dpi | 0 | 0/0/1 | 1 |
| 400 dpi | 0/0/1/1 | 0 | 0/1 |
| 600 dpi | 0/0 | 0/0/1 | 0 |

When (output resolution/input resolution)<1:

{Output address of Formula (1)+correction value in reference table}   (A)

When (output resolution/input resolution)>1:

{Output address of Formula (1)}   (B)

and

{Output address of Formula (1)+correction value in reference table}   (C)

The correction values shown in the reference table represent, beginning with the left in each item, the correction value for a residue of 0 / the correction value for a residue of 1 / ... / the correction value for a residue of n (wherein n represents a positive integral number, which may take a value of 0, 1, 2, or 3 in accordance with the input-output relationship in this example). The output address is determined with Formulas (A), (B), and (C) shown under the reference table. The output address of Formula (1) represents the quotient obtained as a result of the division with Formula (1).

In actual data develop, the data is developed in two scanning directions X and Y. Therefore, the output addresses are allocated by using the reference table with respect to each of the X and Y directions. Specifically, with respect to each direction, in cases where the output resolution is higher than the input resolution, Formulas (B) and (C) are applied. Therefore, in such cases, the two addresses, i.e. {output address of Formula (1)} (B) and {output address of Formula (1) +correction value in reference table} (C), are allocated with respect to one input address. (However, in cases where the correction value is 0, the same address is allocated with respect to one input address.) In cases where the output resolution is lower than the input address, Formula (A) is applied. Therefore, in such cases, the address of {output address of Formula (1)+correction value in reference table} (A) is allocated with respect to one input address.

For example, in cases where the input resolution is 300 dpi, the output resolution is 400 dpi, and the input address is represented by (99, 250), the output address ($X_{01}$, $Y_{01}$) may be represented by the formulas shown below.

$$X_{01}=99(400/300)=132 \text{ residue } 0$$

(The correction value for a residue of 0 is 0.)

$$Y_{01}=250(400/300)=333 \text{ residue } 1$$

(The correction value for a residue of 1 is 0.) Therefore, the output address (132, 333) is allocated with respect to the input address (99, 250). The value of the input address (99, 250) in the raster image data IM1 is outputted as the value of the output address (132, 333) in the raster image data IM2.

Also, in cases where the input address is represented by (134, 251), the output address ($X_{02}$, $Y_{02}$) may be represented by the formulas shown below.

$X_{02}=134(400/300)=178$ residue 2

(The correction value for a residue of 2 is 1.)

$Y_{02}=251(400/300)=334$ residue 2

(The correction value for a residue of 2 is 1.) Therefore, four output addresses (178, 334), (179, 334), (178, 335), and (179, 335) are allocated with respect to the input address (134,251). The value of the input address (134, 251 in the raster image data IM1 is outputted as the values of the four output addresses in the raster image data IM2.

Further, for example, in cases where the input resolution is 400 dpi, the output resolution is 300dpi, and the input address is represented by (402, 223), the output address ($X_{03}$, $Y_{03}$) may be represented by the formulas shown below.

$X_{03}=402(300/400)=301$ residue 2

(The correction value for a residue of 2 is 1.)

$Y_{03}=223(300/400)=167$ residue 1

(The correction value for a residue of 1 is 0.) Therefore, the output address (302, 167) is allocated with respect to the input address (402, 223). In cases where the input address is represented by (403, 223), the output address ($X_{04}$, $Y_{04}$) may be represented by the formulas shown below.

$X_{04}=403(300/400)=302$ residue 1

(The correction value for a residue of 1 is 0.)

$Y_{04}=223(300/400)=167$ residue 1

(The correction value for a residue of 1 is 0.) Therefore, the output address (302, 167) is allocated with respect to the input address (403, 223). As a result, both of the output address corresponding to the input address (402, 223) and the output address corresponding to the input address (403, 223) are the output address (302, 167) and thus overlap one upon the other. As described above, in cases where the output addresses corresponding to an input address overlap one upon the other, an appropriate dot reduction process is carried out.

As described above, the address data is read from the input data storing means 44, and the output addresses to the page data storing means 46 are allocated successively, beginning with an address 0. Alternatively, the output addresses corresponding to the input addresses may be determined by carrying out calculations. In either case, the resolution of the print data, which has been formed by the personal computer, can be converted so as to conform to the resolution of the stencil printer, which is connected to the IF apparatus. A normal print, which is free from image expansion or contraction and image collapse, can thereby be obtained.

Therefore, in cases where the personal computer and the stencil printer are connected with each other via the IF apparatus in accordance with the present invention, the resolution of the print data, which has been formed by the personal computer, can be converted automatically so as to conform to the resolution of the stencil printer. Accordingly, a normal image can be obtained without depending upon the resolution of the print data formed by the personal computer and without depending upon the resolution of the stencil printer.

What is claimed is:

1. A computer interface apparatus, which is to be located between a computer and a stencil printer and carries out operations for forming output data in accordance with print data and feeding the output data into the stencil printer, the print data containing raster image data, which has been formed by the computer, and first resolution data, which represents resolution of the raster image data having been formed by the computer, the apparatus comprising:
    i) a data input means for fetching the print data,
    ii) a printer resolution reading means for reading second resolution data representing resolution, with which the stencil printer is capable of printing, from the stencil printer,
    iii) a resolution converting means for carrying out resolution conversion for converting the raster image data, which is contained in the print data having been fetched by said data input means, into raster image data having the resolution, with which the stencil printer is capable of printing, the resolution conversion being carried out in accordance with the first resolution data, which is contained in the print data having been fetched by said data input means, and said second resolution data, which has been read by said printer resolution reading means, wherein the resolution conversion avoids gaps and overlays in the raster image data, and
    iv) a data output means for forming the output data in accordance with said raster image data, which has been obtained from said resolution conversion carried out by said resolution converting means, and feeding the output data into the stencil printer.

2. A method of forming output data for a stencil printer, wherein output data for a stencil printer is formed in accordance with print data, the print data containing raster image data, which has been formed by a computer, and first resolution data, which represents resolution of the raster image data having been formed by the computer, the method comprising the steps of:
    i) fetching the print data,
    ii) reading second resolution data representing resolution, with which the stencil printer is capable of printing, from the stencil printer,
    iii) carryout out resolution conversion for converting the raster image data, which is contained in the print data having been fetched, into raster image data having the resolution, with which the stencil printer is capable of printing, said resolution conversion being carried out in accordance with the first resolution data, which is contained in the print data having been fetched, and said second resolution data having been read from the stencil printer and representing the resolution, with which the stencil printer is capable of printing, wherein the resolution conversion avoids gaps and overlays in the raster image data, and
    iv) forming the output data in accordance with said raster image data, which has been obtained from said resolution conversion.

3. A computer interface apparatus, which is to be located between a computer and a stencil printer and carries out operations for forming output data in accordance with print data and feeding the output data into the stencil printer, the print data containing raster image data, which has been formed by the computer, and first resolution data, which represents resolution of the raster image data having been formed by the computer, the apparatus comprising:
    i) a data input device that fetches the print data,
    ii) a printer resolution reading device that reads second resolution data representing resolution, with which the stencil printer is capable of printing, from the stencil printer, iii) a resolution converting device that carries out resolution conversion to convert the raster image data, which is contained in the print data having been fetched by said data input device, into raster image data having the resolution, with which the stencil printer is capable of printing, the resolution conversion being carried out in accordance with the first resolution data, which is contained in the print data having been fetched by said data input device, and said second resolution data, which has been read by said printer resolution reading device, wherein the resolution conversion avoids gaps and overlays in the raster image data, and iv) a data output device that forms the output data in accordance with said raster image data, which has been obtained from said resolution conversion carried out by said resolution converting device, and feeding the output data into the stencil printer.

\* \* \* \* \*